Oct. 23, 1951     L. J. BECKHAM     2,572,587
PROCESS FOR PRODUCTION OF AMMELIDE AND AMMELINE
Filed July 3, 1947
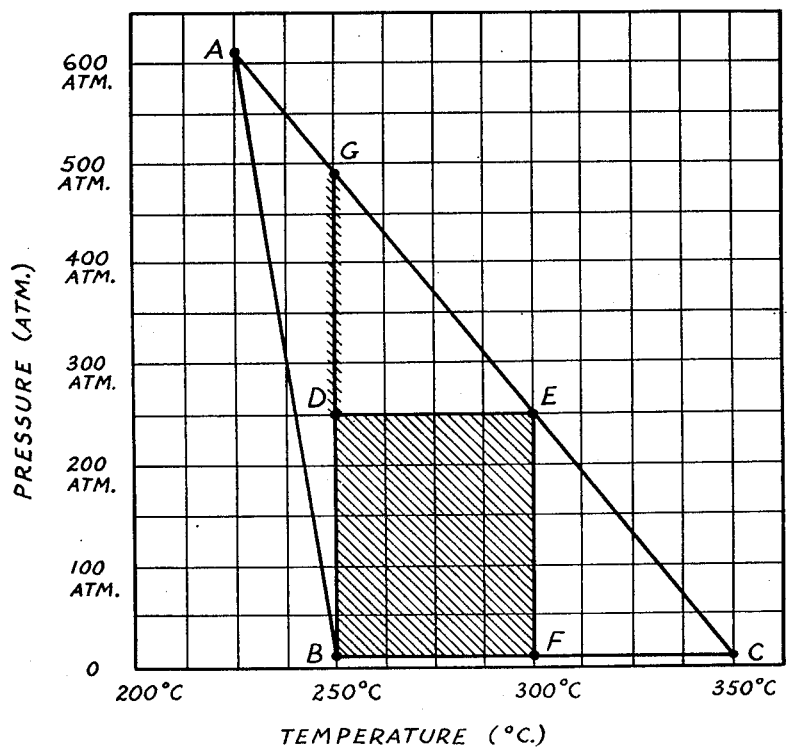
INVENTOR.
LELAND J. BECKHAM
BY Robert A. Harman
ATTORNEY.

UNITED STATES PATENT OFFICE 2,572,587

PROCESS FOR PRODUCTION OF AMMELIDE AND AMMELINE

Leland J. Beckham, Chesterfield County, Va., assignor to Allied Chemical & Dye Corporation, a corporation of New York Application July 3, 1947, Serial No. 758,803

3 Claims. (Cl. 260—249.5)

This invention is directed to processes for decomposing urea to form as principal products of the decomposition other than ammonia and carbon dioxide, ammelide or ammeline or mixtures of the two in various proportions.

By heating urea at atmospheric or reduced pressures the urea may be decomposed to evolve ammonia and form a triazine compound, cyanuric acid. At high temperatures and high pressures when urea is heated it is decomposed to form ammonia and carbon dioxide and the triazine compound melamine. It is an object of my invention to provide a process whereby the compounds ammelide and ammeline may be formed as the principal triazine products of the pyrolysis of urea.

I have discovered that when urea is heated under certain specific conditions of temperature and pressure ammelide and ammeline may be produced as the principal products of reaction of the urea other than ammonia and carbon dioxide, and that these compounds may be obtained in varying proportions according to the particular temperature and pressure under which the urea is heated.

I have discovered that more than 70% of the triazine compounds formed by the decomposition of the urea may be obtained as ammelide and ammeline by heating urea to decomposition temperatures and continuing the heating at temperatures between about 225° C. and about 350° C. and under pressures of urea pyrolysis products in the gas phase falling within a range defined by maxima and minima as follows. The pressures of urea pyrolysis products in the gas phase in my process are not greater than maxima which decrease linearly from about 610 atmospheres for a reaction temperature of 225° C. to about 10 atmospheres for a reaction temperature of 350° C. But at least by the end of the heating period, the pressures of urea pyrolysis products in the gas phase in my process are at least equal to minima which decrease linearly from about 610 atmospheres for a reaction temperature of 225° C. to about 10 atmospheres for a reaction temperature of 250° C. and remain at about 10 atmospheres as a minimum for reaction temperatures between 250° C. and 350° C.

In a preferred embodiment of my invention I employ relatively mild temperature and pressure conditions which still give satisfactory reaction rates and high yields of the desired products. Temperatures between 250° C. and 300° C. and pressures of urea pyrolysis products in the gas phase between 10 atmospheres and 250 atmospheres are especially preferred conditions for operation of my process, as are also temperatures of about 250° C. and pressures between about 10 atmospheres and about 490 atmospheres.

The above-discussed temperature and pressure limits are illustrated in the accompanying diagram in which temperature in C.° is plotted along the abscissa and pressure in atmospheres along the ordinate. All points falling in the area ABC of the diagram correspond to the range of pressures which are reached in my process at least by the end of the heating period. All points within the shaded area BDEF and all points close to the shaded line BDG correspond to preferred conditions as defined above for carrying out my process.

The lower temperatures and pressures within the foregoing ranges promote the formation of ammelide as the principal product of the urea decomposition other than ammonia and carbon dioxide. As higher temperatures and pressures are employed within the specified ranges the amount of ammeline present in the product increases.

In carrying out the process of my invention, the time of heating the urea under the foregoing temperature and pressure conditions may be varied from a few minutes to several hours or more, the time of heating not being critical with respect to the nature of the products obtained. However, heating time does have a second-order effect on the results, so that if at reaction temperatures and pressures close to the upper limits prescribed, excessively long heating times, e. g. 2–3 hours or more, are used, the yield of ammelide and ammeline obtained may be less than would be secured by stopping the heating earlier, e. g. after one-half hour or less at reaction temperature and pressure.

The heating may be carried out either under urea pyrolysis products in the gas phase derived from the urea decomposed in the reaction or with part or substantially all of these urea pyrolysis products replaced by ammonia and/or carbon dioxide from an outside source. The urea may be heated initially mixed with ammonia and/or carbon dioxide. For example, solid urea and liquid ammonia may be introduced into a vessel capable of withstanding high pressures, the vessel closed and the mixture then heated under conditions set forth above to convert urea into ammelide and ammeline.

The pressure ranges referred to herein within which my process is operated are stated in terms of the pressure of the urea pyrolysis products in the gas phase, which are principally the 4:1 to 5:2 mol ratio mixtures of ammonia and carbon dioxide which are reaction products of urea decomposition to ammelide-ammeline mixtures. When additional inert gases (gases such as nitrogen, etc. which do not react with ammelide or ammeline) are introduced the total pressures on the reaction mixture may exceed those heretofore stated. The pressures referred to may be obtained by heating the reaction mixture at a loading density (defined as gram-mols of urea per 100 cc. of reaction space) at which the autogenous pressure of the reaction mixture falls within the specified range; or the prescribed pressures may be obtained by using suitable pumps and valves, etc.—e. g. by providing a valve set to release gases whenever the gas pressure in the reaction zone rises above a prescribed value as a result of the production of reaction gases in the reaction zone.

The following examples are illustrative of the process of my invention, although it is to be understood the invention is not limited to the particular procedures of these examples:

*Example 1.*—Into a 28% chrome-steel lined autoclave provided with a glass liner, solid urea was charged together with solid carbon dioxide in the ratio by weight of 11 parts carbon dioxide to 60 parts urea. The loading density (gram-mol weight of urea charged per 100 cc. of autoclave volume) was 0.5. The autoclave was then closed and heated at about 245° C. for about 6½ hours (including heating-up time). The total pressure in the autoclave at the end of this period, due substantially entirely to urea pyrolysis products including the added carbon dioxide, was about 200 atmospheres.

The heating was discontinued, the autoclave allowed to cool and its contents thoroughly agitated with hot water to remove readily watersoluble impurities such as urea. The mixture of water and solids was cooled to 30° C. and the solids filtered off and dried at about 110° C. The solid product thus obtained (about 41 weight percent of the charge) substantially consisted (98%) of a mixture of ammelide and ammeline with a nitrogen content of 48.7% by weight. Ammelide contains 43.7% by weight of nitrogen and ammeline contains 55.1% by weight of nitrogen. On the urea which was decomposed, the yield of this mixture of ammelide and ammeline was 94% of theory. (A 50 weight percent conversion of urea nitrogen to nitrogen in the triazine products is the theoretical.) By means of further hot water extraction of the solid products, for example by three times heating the products with about 6 parts of water to a temperature above about 80° C., filtering hot above about 80° C., and washing the undissolved solids with about 6 parts of hot water any small amount of cyanuric acid or melamine in the products may be substantially completely removed.

*Example 2.*—The chrome-steel lined autoclave with a glass liner was charged with solid urea in amount such that the loading density was 0.1 gram-mol of urea per 100 cc. autoclave space. The autoclave was closed and heated at about 250° C. for about one hour (including heating-up time) and the resulting product was treated as described in Example 1 for the recovery of water-insoluble material. Operating in this manner a water-insoluble product amounting to about 45% by weight of the urea charged was obtained. This water-insoluble product contained about 48% by weight of nitrogen and represented a yield of about 93 percent theory of ammelide-ammeline mixture based on the urea which was decomposed.

*Example 3.*—Solid urea was charged into an 18:8 chrome-nickel steel autoclave with glass liner in amount corresponding to a loading density of substantially 0.5. The closed autoclave was heated to 300° C. in 50 minutes and maintained at about 300°-302° C. for 30 minutes. A pressure of urea pyrolysis products in the gas phase of substantially 250 atmospheres was reached at the end of the heating period. The water-insoluble portion of the product thus obtained amounted to about 33 weight percent of the urea charged and contained 54.4% nitrogen. It was practically all ammeline. On the urea charged, the yield of ammelide-ammeline mixture was about 73% of the theoretical.

In employing the glass lined, chrome-steel autoclaves in carrying out the process of this and the preceding examples, the glass liner did not form a completely sealed reaction space. Accordingly, some of the reactants or reaction products contacted the metal parts of the autoclave and there was some corrosion of the metal alloy. Small quantities of the resulting corrosion products appeared to have penetrated into the reaction space during the reaction.

In processes of the type described above in connection with the three specific examples where a charge of urea, with or without other materials, is introduced into a pressure vessel and the vessel is then closed and is heated to decompose the urea under pressures autogenously developed by the urea itself (as in the case of Examples 2 and 3) or by the reaction mixture containing urea plus additional material (such as the urea-carbon dioxide reaction mixture present in Example 1), the pressure does not remain uniform throughout the period of heating of the autoclave. The pressure increases progressively as the contents of the autoclave are heated and as the urea is decomposed forming ammonia and carbon dioxide in addition to triazine compounds. The maximum pressure attained during the reaction and the pressure towards the end of the heating period at the temperatures specified for my process are controlling with respect to the production of the desired ammelide-ammeline product of my process. Accordingly, the pressure range under which my process is carried out is defined by maxima which are not exceeded throughout the heating period and by minima which are at least equalled at least by the end of the heating period.

I claim:

1. A process for the production of an ammelide-ammeline triazine product which process consists in heating urea to decomposition temperatures and continuing the heating at temperatures between about 225° C. and 350° C. and under pressures of urea pyrolysis products in the gas phase which do not exceed the values defined by the line "AC" of the accompanying diagram, but which at least at the end of the heating period fall within the area "ABC" of the accompanying diagram, wherein the coordinates of the points A, B and C respectively are 225° C., 610 atmospheres; 250° C., 10 atmospheres; 350° C., 10 atmospheres; and with the mol ratio of the ammonia and carbon dioxide present initially and formed as reaction products not exceeding about 4:1 of ammonia:carbon dioxide; and recovering triazine products which as formed in the reaction contain at least 70% by weight of ammelide-ammeline mixture.

2. A process for the production of an ammelide-ammeline triazine product from a reaction mixture prepared by heating urea to decomposition temperatures, which process consists in heating said reaction mixture at temperatures within the range between 250° C. and 300° C. and under pressures of urea pyrolysis products between 10 atmospheres and 250 atmospheres and with the mol ratio of ammonia and carbon dioxide present initially and formed as reaction products not exceeding about 4:1 of ammonia: carbon dioxide; and recovering triazine products which as formed in the reaction contain at least 70% by weight of ammelide-ammeline mixture.

3. The process for the production of an ammelide-ammeline triazine product which consists in heating urea to decomposition temperatures, maintaining the resulting reaction mixture at temperatures of about 250° C. and pressures of urea pyrolysis products of at least 10 atmospheres and not above 490 atmospheres for a period of about 10 to 60 minutes and with the mol ratio of ammonia and carbon dioxide present initially and formed as reaction products not exceeding about 4:1 of ammonia:carbon dioxide, digesting the resulting triazine reaction product, which as formed in the reaction contains at least 70% by weight of ammelide-ammeline mixtures, with water and separating the solid material undissolved by the water at temperatures of about 80° C. to 100° C. from the solution in the water of the soluble portion of said product.

LELAND J. BECKHAM.

REFERENCES CITED

The following references are of record in the file of this patent:

UNITED STATES PATENTS

| Number | Name | Date |
|---|---|---|
| 2,087,980 | Lawrence | July 27, 1937 |

FOREIGN PATENTS

| Number | Country | Date |
|---|---|---|
| 583,504 | Great Britain | (1946) |
| 585,504 | Great Britain | Dec. 19, 1946 |

OTHER REFERENCES

Diario Oficial (Brasil) Secao III, May 14, 1945, pp. 1023–1024.